United States Patent [19]

Giebler

[11] 3,718,782

[45] Feb. 27, 1973

[54] METHOD AND APPARATUS FOR DETECTING TERMINAL SIGNALS IN CENTRALLY CONTROLLED TELECOMMUNICATION INSTALLATIONS

[75] Inventor: Fritz Giebler, Munich, Germany

[73] Assignee: Siemens Aktiengesellschaft, Munich, Germany

[22] Filed: Dec. 2, 1970

[21] Appl. No.: 94,435

[30] Foreign Application Priority Data

Dec. 9, 1969 Germany....................P 19 61 752.8

[52] U.S. Cl. ................................................179/18 J

[51] Int. Cl. ................................................H04q 3/00

[58] Field of Search ......................................179/18 J

[56] References Cited

UNITED STATES PATENTS

| | | | |
|---|---|---|---|
| 3,090,836 | 5/1963 | Bezdel | 179/18 J |
| 3,105,878 | 10/1963 | Frankel | 179/18 J |
| 3,133,154 | 5/1964 | Van Bosse | 179/18 J |
| 3,244,811 | 5/1966 | Vogel | 179/18 J |
| 3,258,539 | 6/1966 | Mansuetto | 179/18 J |

*Primary Examiner*—Harold I. Pitts
*Attorney*—Birch, Swindler, McKie & Beckett

[57] ABSTRACT

The duration of a terminal signal on a telecommunication line in a binary coded multiplex space division switching system is measured by counting synchronizing pulses occuring during receipt of the signal which has a known duration and polarity. A decentralized marker assigned to each line detects the first pulse. If a succeeding pulse is detected, a central counting stage is assigned to the line to determine if the requisite number of pulses to constitute a terminal signal are received, after which the central control terminates the connection.

12 Claims, 5 Drawing Figures

METHOD AND APPARATUS FOR DETECTING TERMINAL SIGNALS IN CENTRALLY CONTROLLED TELECOMMUNICATION INSTALLATIONS

BACKGROUND OF THE INVENTION

The invention is directed to method and apparatus for supervising message connections and especially for detecting terminal signals in a centrally controlled telephone exchange installation for binary coded messages in a space division multiplex switching system wherein the terminal signal is represented by a predetermined signal potential having a specified time duration.

In data exchange systems each existing connection on a line is supervised by a connection supervision system to detect arriving terminal signals. It determines if a subscriber or a participating exchange desires to disconnect from the line, i.e., release the connection, and communicates this fact to the exchange through a prolonged transmission of a start polarity signal on the line. In present exchange systems the connection supervision device essentially comprises time linkages in the form of drop-out delayed relays or electronic timing circuits. These are assigned to the subscriber circuits and telephone line cutoffs themselves, or to special connection sets. They evaluate time periods during which start polarity exists on the line and cause disconnection of the connection if this exceeds a time duration which corresponds to the terminal signal. Another method, utilizing pulse counting techniques, is disclosed in German Pat. publication No. 1,298,537.

In current centrally controlled exchange systems incorporating space division multiplex switching systems the connection supervision system is located in the connection sets and telephone line cutoffs. The connection supervision is thus decentralized resulting in high circuit costs.

SUMMARY OF THE INVENTION

An objective of centrally controlled exchange installations is to solve as many switching tasks as possible with the aid of the central control for the purpose of cost reduction. These tasks include the supervision of connections.

It is therefore an object of this invention to simplify the peripheral circuitry of the connection supervision system through centralized processing of terminal signals.

According to this invention the terminal signal duration is measured by counting synchronization pulses. This is accomplished by detecting and storing the first synchronizing pulse coinciding with a terminal polarity signal on a connection line in a decentralized counting stage assigned to the line or associated connection set line cutoff. Upon the detection of a second, or succeeding synchronizing pulse coinciding with a terminal polarity signal on the same line by the same decentralized counting stage, a central control system assigns to the line in question a central counter stage. This central counter stage is advanced by further synchronizing pulses coinciding with terminal polarity signals until it has stored a number of pulses corresponding to the predetermined duration of the terminal signal whereupon the connectionis released.

This invention makes it possible to replace the time determining circuits by counters, for example by binary counters. The interval between two synchronizing pulses thus is not to be longer than the admissible tolerance of a terminal signal to be detected, avoiding a so-called rest error. If the distance between two synchronizing pulses is longer than the duration of terminal signals of start polarity occurring during a normal data transfer operation, then during each writing operation only the first stage of these counters is advanced; and this only occurs if start polarity coincides on the line with a synchronizing pulse. Before the counter is advanced again by the next synchronizing pulse, arriving stop polarity resets the first stage of the counter. Each decentralized connection supervision circuit therefore needs only a one-stage counter. In the case where this counter is filled and further counting pulses arrive, the central control assigns to the connection supervision center in question a multi-stage counter. The assigned multi-stage counter is in operation only during the terminal signals' duration. In comparison to the duration of a connection this time period is very short. Thus for a large number of decentrally arranged connection supervision circuits only a few centrally arranged counters are required. These counters may also be represented by programs in the central control.

BRIEF DESCRIPTION OF THE DRAWINGS

Further details of the invention are described in the following with the aid of drawings.

DESCRIPTION OF PREFERRED EMBODIMENTS

Figure 1:
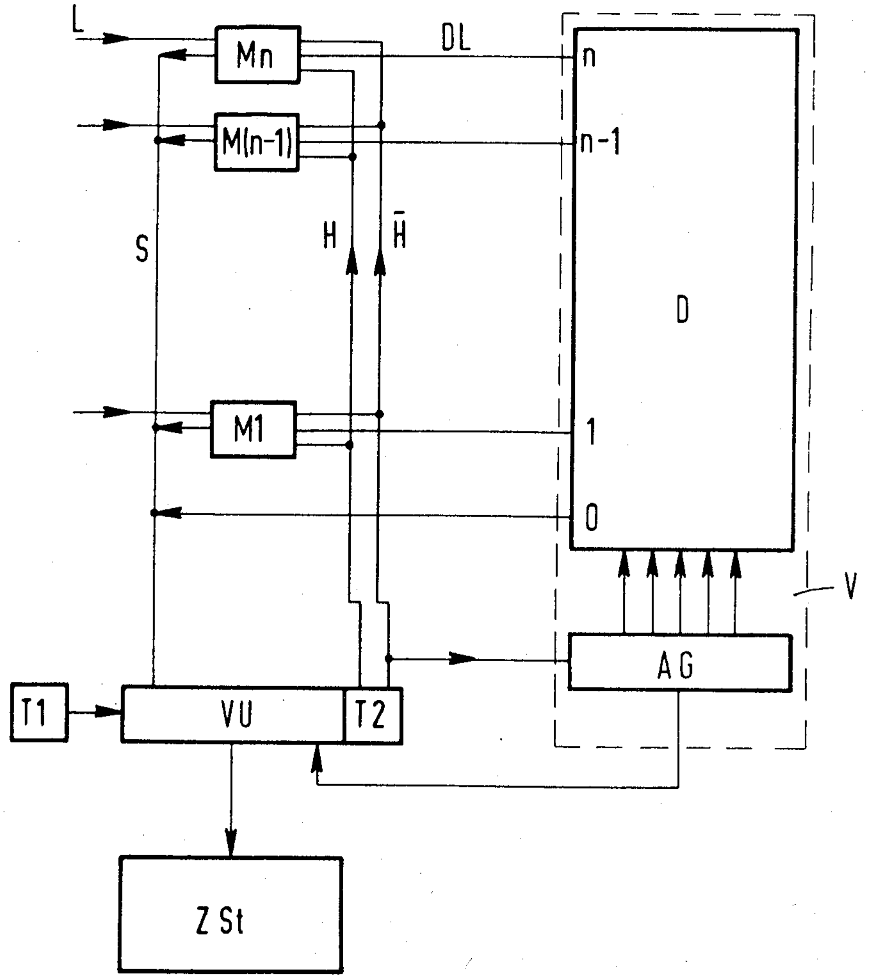
FIG. 1 shows a block circuit diagram of an arrangement for measuring release times in accordance with this invention.
Figure 3:
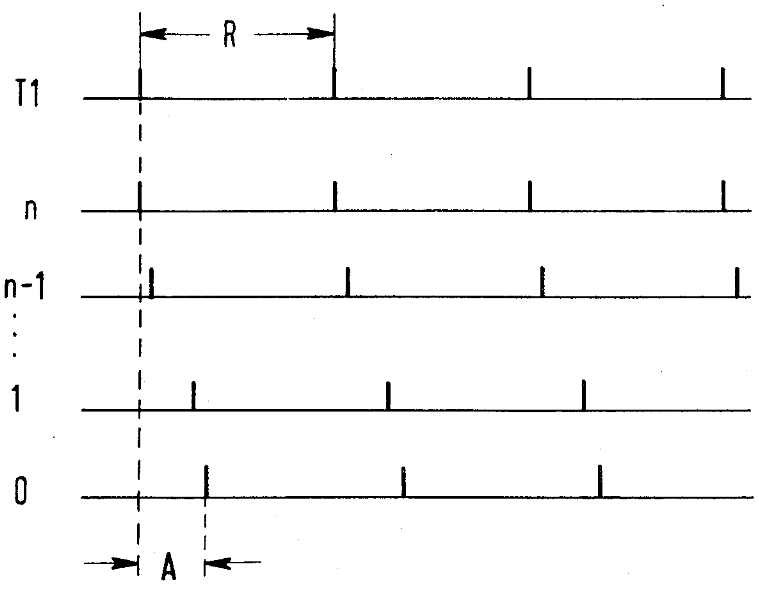
FIG. 3 shows a time raster for the interrogation of the markers in the circuit of FIG. 1.

FIG. 1 shows on the left-hand side connection lines L to be supervised which are couple through markers Mn to Ml and distributor lines DL to distributor V. This distributor consists of an address generator AG and a decoder D. Address generator AG is developed as binary counter, to which synchronizing pulses are conveyed from an impulse generator T2. Impulse generator T2 is started by an impulse generator T1, determining the inquiry interval in frame interval R (FIG. 3). This frame interval is selected in such a way that the admissible tolerance of the terminal signal determines, to the extent possible the frame interval. On the other hand the frame interval must be selected in a manner coarse enough that the longest time period within which start polarity occur may during a writing operation is shorter than the frame interval R. For CCIT Code No. 2 with five signal steps, a step speed of 50 Bd and with terminal signal times of 300 or 600 ms, a time frame with a 120 ms frame interval is suitable. Thus before the release of a connection 3 or 6 time marks respectively are to be counted. In this case the tolerances of the raster times are about ±20 percent.

Address generator AG forms, at each impulse received from Synchronizing pulse generator T2, a different marking address which is decoded by decoder D. In this manner outlets *n*, *n*–1, ... 1, 0 can be interrogated in succession within one inquiry cycle. If, for example, outlet *n* is to be interrogated, an inquiry pulse, which is shown in FIG. 3, line *n*, appears on distributor line DL. In similar fashion timely successive inquiry pulses also appear at the other outlets *n*–1, ... 0 of the decoder D which are also shown in FIG. 3. The time interval between a synchronizing pulse of pulse generator T1 and an inquiry pulse at outlet 0 of the decoder forms each inquiry cycle A.

Figure 2:
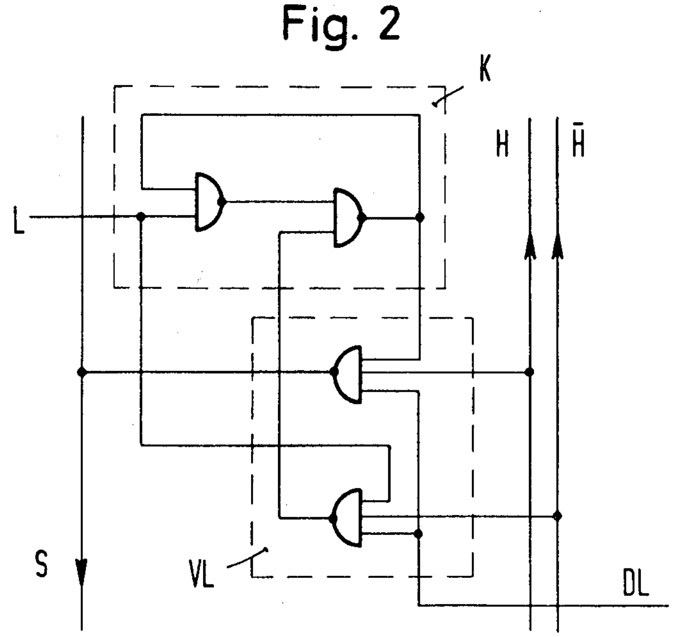
FIG. 2 shows a schematic diagram of a marker which may be utilized in the circuit of FIG. 1.
Figure 4:
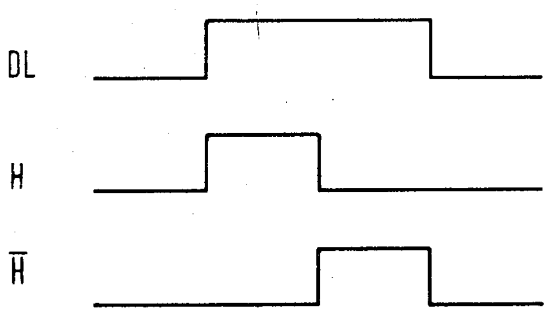
FIG. 4 shows auxiliary synchronizing pulses and a distributor pulse which may be utilized in the circuit of FIG. 1.

The structure of a suitable marker Mn is shown in FIG. 2. Each marker includes a flip-flop stage K and a connection logic device VL which in this exemplary embodiment include NAND gates. The inputs of connection logic device VL are connected with the output of the flip-flop stage K, auxiliary pulse lines H, $\overline{H}$ and distributor line DL. One output of the connection logic device VL is connected with an input of the flip-flop stage K and another output with a collective line S. FIG. 4 shows the inquiry pulse conveyed over line DL to connection logic device VL and the auxiliary pulses on lines H, $\overline{H}$. If on a connection line L at the time of its interrogation ("1" on DL) start polarity exists indicating the existence of a terminal signal, which may correspond to the logic "1," then a "1" is registered in the flip-flop stage K of the marker Mn. If stop polarity follows on the line L this corresponds to the logic "0", flip-flop stage K is returned to "0" as the terminal signal was false or retracted. But if the start polarity continues on line L, then the inquiry pulse of the following inquiry cycle A again detects a logic "1" on the line. As a consequence there appears at the output of connection logic VL, connected with collective line S, a signal, which is conveyed to the connection supervision control VU. The address of this marker is stored in address generator AG and is conveyed to connection supervision control VU. Connection supervision control VU thereupon asks the central control ZSt of the exchange to assign a multi-stage counter to this marker. All further signals arriving from the marker of the same address on the collective line S in the following interrogation cycles are counted by this assigned multi-stage counter, until 3 or 6 time marks (as discussed above) are detected. Thereupon the central control ZSt causes the disconnection of the connection of the line assigned to this marker.

In the connection sets of the exchange, in addition to connection supervision, tasks such as opening and closing of the branches, repoling, etc., must be carried out. For this purpose there is already provided a distributor, with which the individual connection sets can be interrogated. In this distributor is also utilized by the connection supervision control, the circuit requirements for connection supervision to detect terminal signals are reduced to the circuit of the marker M and one circuit each for adaptation of the line level to the logic level.

Figure 5:
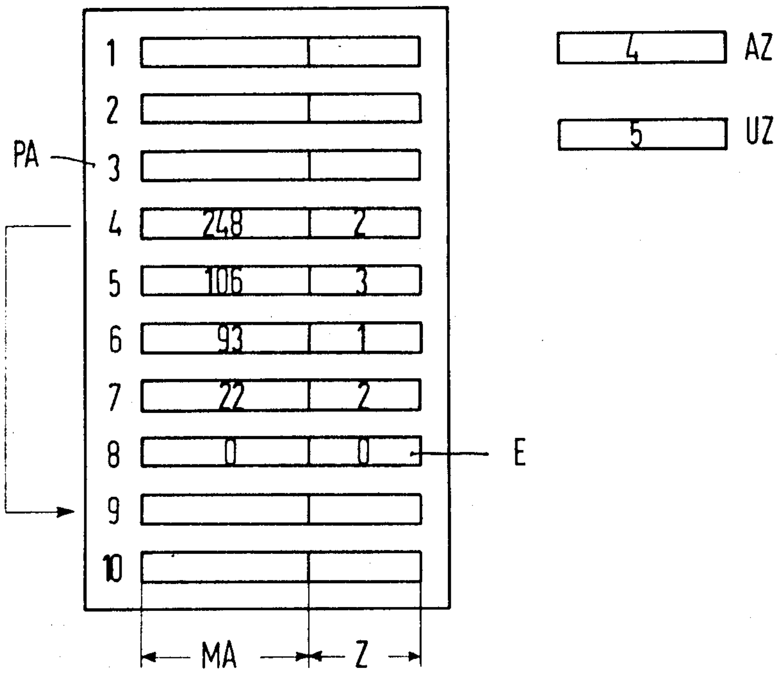
FIG. 5 shows an arrangement of counters in a control center of a telephone exchange in accordance with this invention.

It is possible with this invention to construct the necessary counters within the central control ZSt out of flip-flop stages. Even this circuit requirement can be avoided if the counters are arranged within the operative storage area of the central control. For this purpose an area is reserved in the operative storage area wherein for each marker transmitting signals onto collective line S a time counter is assigned which may be a cell or a part of a cell in the storage area. FIG. 5 shows a storage area or counter field with 10 storage cells, the respective place addresses 1 to 10 of which are indicated on the left-hand side of the field. Each storage cell utilized contains a marking address MA of a marker M and the momentary counter value 0 to 3 or 6 of that marker. In this example the addresses of markers 248, 106, 93 and 22 are shown, indicating these are currently in use. The addresses of all currently used counters are inserted in the field in series without gaps in decreasing order. The last utilized cell in the counter field always contains marking address 0. This address serves as the terminal mark of the utilized storage area within the counter field. It has place address 8 in the example which is shown in FIG. 5. The place address of the first utilized cell or place — in this example it is 4 — is in each case stored in a register, address meter counter AZ. A further register, also included in the central control ZSt, overflow meter UZ, indicates the number of remaining free places or cells in the reserved storage area; in this example 5 places are still free.

The markers are interrogated in the same order as the counters are arranged in the counter field of the storage area according to decreasing addresses. As a consequence the signals of the markers on the collective line S also arrive at the central control ZSt arranged according to decreasing addresses. The address, fixed by address generator AG of the first marker reporting during an inquiry cycle is compared with the address which is stored in the storage place designated by address meter AZ. The address comparison can have three different results. At each comparison the contents of the desired storage cell including a marker address and a counter value are first read and then transmitted into a register. The address of the storage place or cell is taken out of the address meter AZ. Thus the addressed storage cell is cancelled. If the compared addresses are equal, the marker requesting the comparison had reported in the preceding inquiry cycle; therefore the counter value of the storage cell read is increased by "1." Finally the contents of the comparison register — the marker address and the changed counter value — are recorded into the storage cell directly following after the utilized storage area. The place address of this cell is calculated from the contents of registers AZ, UZ and the length of the reserved storage area. The value of address meter AZ is then increased by "1" and is thereby again set to the place address of first utilized storage cell. In the example according to FIG. 5 the address 248 is transmitted out of the storage cell 4 indicated in the address meter, into storage cell 9; the value of address meter AZ is then increased to 5; and the value of the associated central counter is increased to 3. In similar fashion address 106 is transferred out of cell 5 into cell 10, etc. The contents of overflow meter UZ remain unchanged in each case.

If the comparison of the two addresses shows that the marker address reported to the central control ZSt from connection supervision control VU is higher than the address stored in the counter field, the marker in question is sending a signal over collective line S for the first time. Therefore the central control ZSt assigns to this marker counter directly following the utilized cells of the storage area, thus, for example, cell 9. The contents of address meter AZ remain unchanged, but those of overflow meter UZ are reduced by "1."

If the comparison of the two addresses shows that the marker address reported to the central control ZSt by the connection supervision control is lower than the address stored in the counter field of the storage area and the reported address therefore lies in the sequence behind that of the cell being read, this means that the marker assigned to this cell had transmitted a signal onto collective line S in the preceding cycle, but in the meantime due to stop polarity arriving on the line the flip-flop stage in the marker was set back again. This case of improper assignment of a cell can occur, for example, where the subscriber decides not to release the connection. If such a mis-assignment occurs, the central control ZSt cancels the storage cell being read and increases the contents of address meter AZ and those of overflow meter UZ by "1" in each case. The address comparison is then carried out with the following addresses until either equality is determined or the reported address lies in the sequence before that of the counter.

In each of the above cases the central control ZSt examines, at the same time as the marker addresses, the corresponding counter value. If this reaches a value corresponding to the predetermined terminal signal time (3, or 6) the central control disconnects the pertinent connection.

The marker address "0" is assigned to the last cell read on the collective line S in each cycle. This signal serves as the terminal mark of the utilized storage area. The central control recognizes upon receipt of this address signal the end of the utilized storage area and that it must wait until the next cycle initiated by pulse generator T1. After the central control ZSt finds equality between the contents of the said register into which the contents of each storage cell of the reserved storage area is transferred, and marking address "0," the contents of the address meter are further increased by "1," so that the address meter AZ indicates the place address of first utilized cell of the storage area to be compared in the next interrogation cycle. This terminates the process. As the storage cells — as already explained — are cancelled in each case during reading, the reserved storage area can again be written on from the beginning, after the last storage cell has been reached. Thus the storage area is closed into an endlessly "letterable" ring.

If a cell lying within the reserved storage area is requested by one of the markers, the central control first checks if there is a free cell available in this area. If no free cell is available, the request is not processed. However, it is processed in the next following cycle as soon as a cell becomes free.

The required number of cells in the reserved storage area depends on the number of signals transmitted by the markers, per time unit, and on the duration of utilization of the storage cells.

I claim:

1. Process for detecting terminal signals of known polarity and time duration on lines carrying binary coded information thereby supervising message connections in a centrally controlled telecommunication exchange in a space division multiplex switching system, a marker including a counter being associated with each of said lines, the process comprising:

assigning a marker address to each of said markers thereby identifying each connected line, applying a series of synchronous pulses to said marker, detecting the first occurrence of a synchronous pulse coinciding with receipt of a signal of terminal signal polarity on the line identified by said marker, storing said detected pulse in the counter of said marker, detecting a next following synchronous pulse coinciding with said terminal polarity signal on said line, assigning a central counter to said line identified by said marker address, said central counter being advanced by the detection of further synchronous pulses coinciding with said terminal polarity signal in said marker, and releasing the connection on said identified line when said central counter has stored a number of pulses corresponding to the known terminal signal duration.

2. Apparatus for supervision message connections on lines carrying binary coded messages in a space division multiplex switching system, by detecting in a centrally controlled telecommunication exchange a terminal signal of known polarity and time duration, said apparatus comprising:

a distributor including means for cyclically assigning addresses to each of said lines and means for applying inquiry pulses to each of said lines, a marker connected between each of said plurality of lines to be supervised for the detection of terminal signals and said distributor, said marker including means for storing a signal indicating coincidence of said inquiry pulse and a signal of terminal signal polarity on said line, a connection supervision control cooperating with said distributor for cyclically interrogating said storage means of said marker, a central control connected to said connection supervision control and including a means for counting a number of pulses equal to said known terminal signal time duration, and said connection supervision control being responsive to said marker storage means to connect said marker to said counting means so that the duration of said terminal signal may be counted.

3. Apparatus as claimed in claim 2 wherein said distributor includes means for carrying out other switching tasks of said telecommunication exchange.

4. Apparatus as claimed in claim 2 wherein said distributor includes an address generator AG for assigning a differing binary address to each of said markers, a synchronizing pulse generator for conveying inquiry pulses to said address generator and a decoder D for converting binary addresses from said address generator into code to successively interrogate each of said markers.

5. Apparatus as claimed in claim 2 wherein said signal storing means include a one bit settable storage device, said device being settable by a terminal signal of known polarity on the line (L) assigned to said marker coinciding with an inquiry pulse from said distributor.

6. Apparatus as claimed in claim 2 wherein said counting means includes cells of a storage area of said central control, each cell including means for storing the address of a marker formed by said distributor and means for counting the number of successive inquiry pulses coinciding with said terminal signal in said marker.

7. Apparatus as claimed in claim 6 wherein said marker includes a connection logic device (VL) connected between the line (L) assign-ed to said marker and the distributor (V) including a one bit settable storage device, means for setting said one bit store upon detection of a signal of terminal polarity on said assigned line (L) coinciding with an inquiry pulse from said distributor, and means actuated by the setting of said one bit store and responsive to the detection of a second pulse coinciding with the signal of terminal polarity on said assigned line for requesting assignment one of said cells of said counting means by said central control to said assigned line.

8. Apparatus as claimed in claim 7 wherein said means for requesting assignments includes a common signal line (S) connected between each of said markers and said connection supervision center.

9. Apparatus as claimed in claim 7 wherein said central control includes means for inserting marking addresses in said cells of said counting means in an sequential decreasing order without gaps according to marking addresses, and means for inserting the marking address "O" as a terminal marker in a cell adjacent said sequence of addressed cells, a first register (AZ) for indicating an address of a first storage cell of said sequential cells storing a marker address and value and a second register (UZ) for indicating the number of free storage cells in said storage area.

10. Apparatus as claimed in claim 9 wherein said central control includes means responsive to said cell requesting means of each of said markers for comparing the marker address of said marker with the marker address in the sequence of cells of said counting means thereby identifying a marker receiving a succession of signals of terminal signal polarity.

11. Apparatus as claimed in claim 10 wherein said distributor includes an address generator (AG) for assigning a differing binary address to each of said markers, said address generator being coupled to said central control so that the address of the marker requesting a cell is compared with the addresses stored in said sequence of cells.

12. A process as claimed in claim 1 wherein said central counter includes a plurality of storage cells for storing in adjacent sequentially descending order addresses of markers receiving terminal signals and corresponding pulse counter values indicating terminal signal duration, said process comprising the steps of;

reading out and cancelling a marker address and terminal pulse counter value in a first cell of said sequence of cells, comparing the marker address of said marker detecting receipt of terminal polarity pulses with the address of the marker stored in said first storage cell of said sequence of cells, and as a result of the comparison, upon finding equality of the stored address and said reported address increasing the counter value associated with said marker address by "1" and inserting the compared marker address and the increased counter value into a first free cell adjacent and subsequent to the utilized storage cells of said central counter, upon finding that said reported address is higher than said first cell stored address, assigning said reported marker address to said subsequent cell, decreasing the available cells in said central counter by "1," or upon finding that said reported address is lower than said first cell stored address, cancelling said stored marker address, increasing the available cells in said central counter by "1."

* * * * *